Oct. 14, 1930.  M. W. PITNER  1,778,566
TRESTLE
Filed Feb. 13, 1928  2 Sheets-Sheet 1
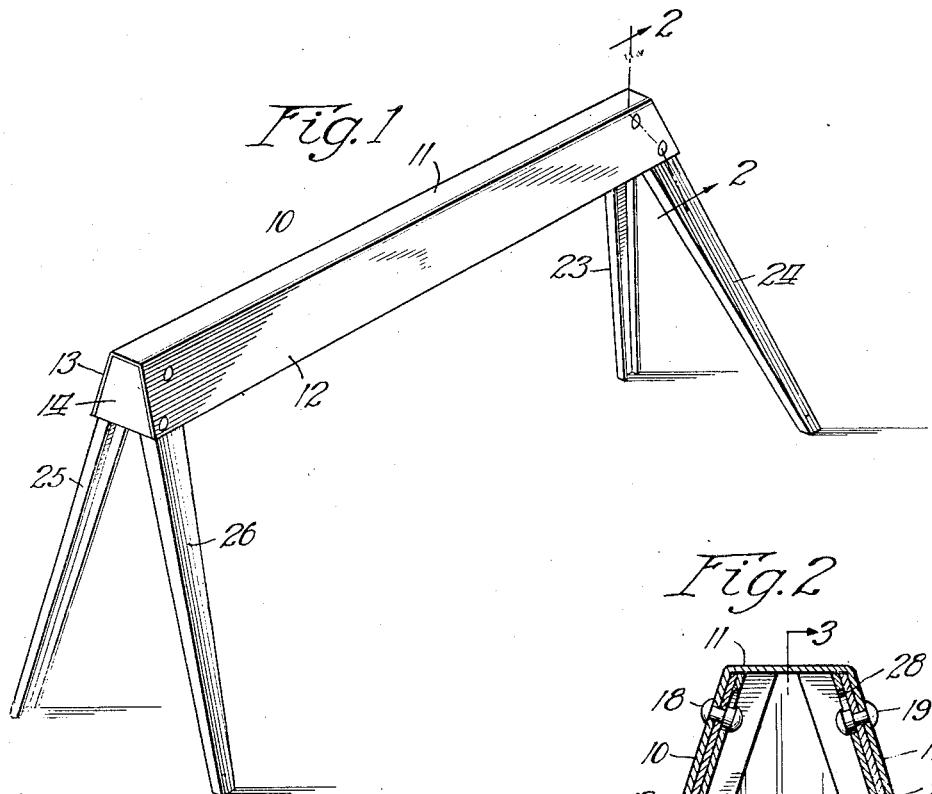
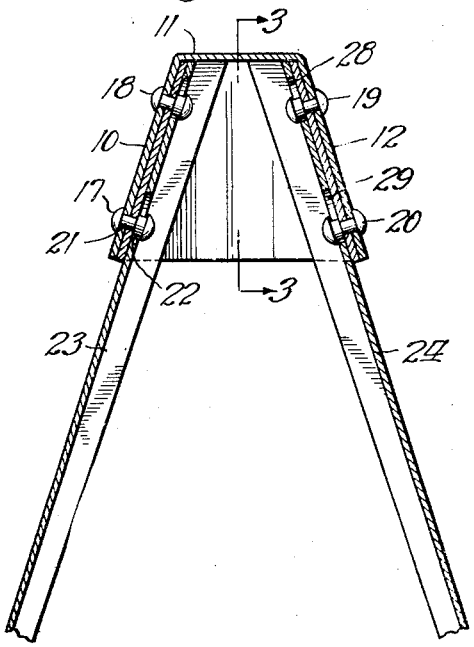
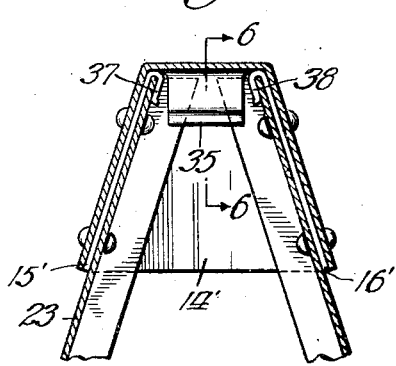
Inventor
Marion W. Pitner
By Gabel & Banning Attys.

Oct. 14, 1930.   M. W. PITNER   1,778,566
TRESTLE
Filed Feb. 13, 1928    2 Sheets-Sheet 2
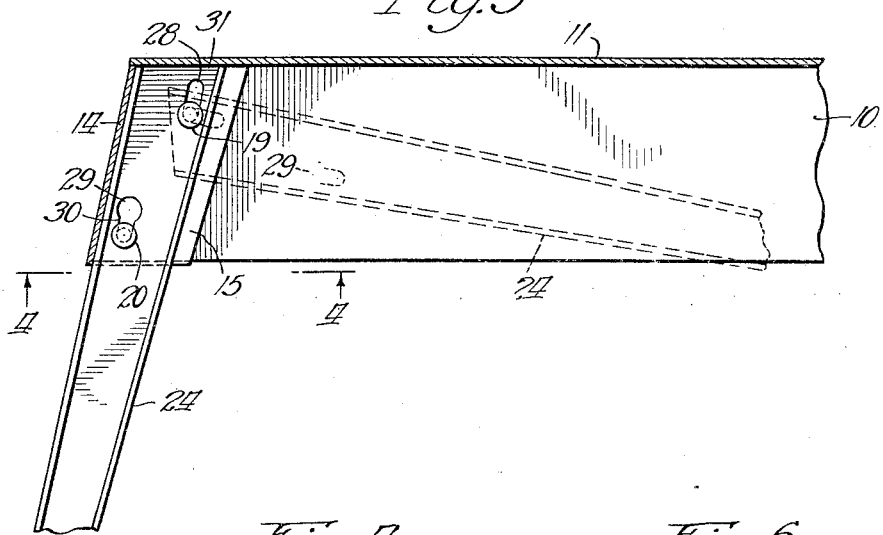
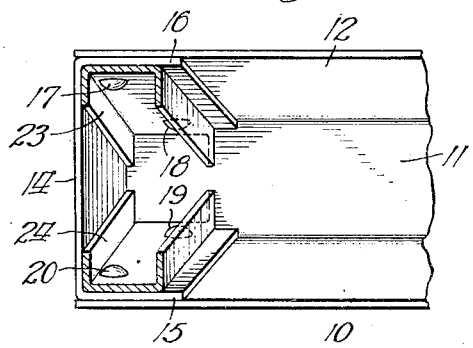
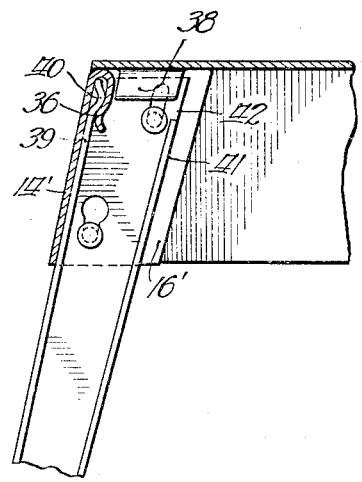
Inventor
Marion W. Pitner
By Zabel & Banning Attys.

Patented Oct. 14, 1930

1,778,566

UNITED STATES PATENT OFFICE

MARION W. PITNER, OF CHICAGO, ILLINOIS, ASSIGNOR TO TRAV-LER MANUFACTURING CORPORATION, OF CHICAGO, ILLINOIS, A CORPORATION OF ILLINOIS

TRESTLE

Application filed February 13, 1928. Serial No. 254,050.

My invention relates to trestles and more particularly to trestles of the foldable or knock-down type wherein the legs may be readily folded from their operative position into a position substantially parallel to the beam so that they will make a compact easily transported structure.

It is a purpose of this invention to provide a trestle which will be economical to make and light in weight and which will at the same time be extremely rigid in its operative position.

It is also an object of this invention to provide a novel means for connecting the legs to the beam which at the same time greatly reinforces the connection as well as the rigidity of the beam.

It is also an object of this invention to provide a trestle in which the foldable legs can be firmly held in operative position without the use of brace members extending below the beam or any inner-connecting brace between the several legs.

More particularly it is an object of this invention to provide means for connecting the foldable legs to an inverted U-shaped beam whereby the legs when extended in operative position do not support the weight of the beam on the pivoting members but instead directly contact at their end with a portion of the beam so as to relieve the pivot members of the weight placed on the beam.

Another specific object of the invention is to provide foldable legs for a beam of the character just mentioned, which legs must be pulled downwardly away from the beam before they can be folded into knock-down position.

Other objects and advantages of the invention will appear as the description proceeds when taken in connection with the accompanying drawings. However, it is to be distinctly understood that I do not intend to limit myself to the exact details shown and described, but that I intend to avail myself of all such modifications as would occur to one skilled in this art and as would fall within the scope of the claims.

In the drawings:

Fig. 1 is a perspective view of the trestle in operative position;

Fig. 2 is a section on line 2—2 of Fig. 1;

Fig. 3 is a section on the line 3—3 of Fig. 2;

Fig. 4 is a section on the line 4—4 of Fig. 3;

Fig. 5 is a section similar to section shown in Fig. 2 but showing a modified construction; and Fig. 6 is a section similar to Fig. 3 along the line 6—6 of Fig. 5.

Referring now in detail to the drawings, the trestle comprises a beam 10 which is a piece of sheet steel bent to provide a top portion 11 and two divergent sides 12 and 13 depending therefrom. Adjacent the opposite ends of this beam are provided a pair of braces which consist of the end portion 14 and the inwardly bent portion 15 and 16 adapted to fit within and snugly contact with the divergent sides 12 and 13 of the beam 10. The reinforcing braces are secured to the divergent sides of the beam by a plurality of rivets 17, 18, 19 and 20 each of which rivets are provided with a smaller shank portion 21 and an enlarged portion 22 which forms a shoulder adjacent the shank portion 21 to permit riveting of the brace to the divergent side of the beam. The rivets, of course, are provided with heads at the opposite ends in the usual manner.

The legs 23, 24, 25 and 26 are secured to the beam by means of the rivets 17, 18, 19 and 20, these legs as shown being composed of channel beams of sheet steel and tapering toward the bottom thereof.

Each of the legs as shown is provided with an elongated opening adjacent the top to receive the enlarged portion in one of the rivets 18 or 19, while farther down each of the legs is provided with a key slot having the enlarged upper portion 29 slightly larger than the head of the rivet which fits therein and the smaller lower portion 30 which is just a sufficient size to receive the enlarged portion 22 of the rivet. Thus when the leg is in the solid line position shown in Fig. 3, the upper end 31 thereof is adapted to brace directly against the lower surface of the top of the beam so that the load placed on the beam is not carried directly by the rivets but instead is communicated directly from the beam to the leg on the top thereof.

Now when it is desired to fold the leg, it is pulled downwardly with respect to the beam so that the rivets move into the upper portions of the slots 28 and 29 and then to release the leg so that it may be folded the lower portion thereof is drawn inwardly away from the beam so that the head of the rivet is passed through the opening 29 and after that the leg may swing around the upper rivet as a pivot into the dotted line position shown in Fig. 3. Thus, it is necessary in moving the legs from folded position to operative position to swing them about the upper rivet as a pivot until they are fully extended and then to shove them upwardly until the top of the leg engages with the under surface of the beam. The only way then that a loaded trestle could fall down without breaking or collapsing would be for the beam and load to rise without the legs and then for the legs to be flexed inwardly to disengage them from the edge of the lower rivet. This would be practically impossible in the use of the trestle and therefore there is no danger of the legs of this trestle folding up while it is in use.

Since there are no struts or ties below the beam, the construction at the junction of the legs with the beam must be very strong for when the trestle is standing on a smooth floor and supporting a heavy load, the lower ends of the legs tend to spread farther apart. This tends to spread the beam and cause the lower portions of the divergent sides 12 and 13 to spread farther apart. At the same time the pull inwardly at the top of the legs on the upper rivets tends to compress and collapse the beam at the top. These two tendencies are obviously about equal and owing to the length of the legs and short distance between the top of the beam and the lower edges of the divergent sides, they are quite great. The reinforced braces have a tendency to prevent the spreading action referred to above since the bent side portions 15 and 16 are directly connected to the web 14 and the strains thereon due to the spreading of the legs tend, in a measure, to counteract each other, as for instance, in the wing 15 of the brace while the bottom is being pressed outwardly by the leg, the top is being pulled inwardly and one action tends to offset the other. The portions 15 and 16 of the braces extend somewhat beyond the legs shown in Fig. 4 to further reinforce the beam at this point. Thus the braces contribute greatly to the stiffness of the sides and since the strength of the beam depends largely upon the sides being held in their normal plane, the braces are of considerable advantage in strengthening the beam at the point of greater stress.

Referring now to Figs. 5 and 6, there is illustrated a slight modification of the structure which is designed to further strengthen the connection between the legs and the beam and to take the load off the securing rivets. As shown in Fig. 5, the end brace has the usual web portion 14' but at the top of this web there is an inwardly and downwardly bent lip 35 which as shown in Fig. 6, is curved back toward the main body portion of the web at 36. Again the wings 15' and 16' are provided at their tops with the rebent portions 37 and 38 which hook down over the tops of the legs as shown clearly in Fig. 5.

The outer channel 39 of each leg is provided with a curved portion 40 adapted to hook under the re-bent portion 36 of the web 14' when the leg is in the upward position so as to hold the leg against sliding downward after it is placed in operative position. As shown in Fig. 6, the inner channel 41 of the leg is cut away as at 42 so that when the leg is pulled downwardly, it is free to fold in the same manner as in the approved structure.

The portions 37 and 38 on the wings of the brace by engaging the tops of the legs tend to prevent the tops of the legs from swinging inwardly away from the brace and thus take the load off of the upper rivets to prevent their being broken. Thus when the trestle is set up in operative position practically the entire strain placed thereon by a load is communicated from the beam directly through the brace members to the legs and not through the rivets. This makes it unnecessary to use a very heavy rivet and eliminates one of the weakest points of structures of this character, while, at the same time, the flexibility and collapsibility of the trestle is equally as good as in types not using this form of brace.

From the above description it is thought that the construction and advantages of this device will be clear to those skilled in this art and having thus described my invention, what I claim and desire to secure by Letters Patent of the United States is:

1. In a device of the character described, a support on which articles may be supported, said support having flanges depending therefrom, supporting legs attached to said flanges and having a limited sliding movement away from said support and means normally holding said legs extended, but permitting said legs to fold when they are slid away from said support.

2. In a device of the character described, a support on which articles may be supported, said support having flanges depending therefrom, supporting legs attached to said flanges and having a limited sliding movement away from said support, and interengaging means on said flanges and said legs normally holding said legs extended, but permitting said legs to fold when they are slid away from said support.

3. The combination with a beam having a top and depending sides, of a pair of spaced braces each comprising an end portion and two angular side portions integral therewith, said side portions being fastened to said sides whereby said braces connect and reinforce certain portions of said sides, and supporting legs attached to said reinforced portions.

4. The combination with a beam having a top and depending sides, of a pair of spaced braces each comprising an end portion and two angular side portions integral therewith, said side portions being fastened to said sides whereby said braces connect and reinforce certain portions of said sides, and supporting legs attached to said reinforced portions, said legs being foldable between said depending sides.

5. The combination with a beam having a top and depending sides, of a pair of spaced braces each comprising an end portion and two angular side portions integral therewith, said side portions being fastened to said sides whereby said braces connect and reinforce certain portions of said sides, and supporting legs attached to said reinforced portions, said legs having a limited sliding movement vertically relative to said beam.

6. The combination with a beam having a top and depending downwardly divergent sides, of a pair of spaced braces each comprising an end portion and two angular downwardly divergent side portions integral therewith, said side portions being fastened to said sides whereby said braces connect and reinforce certain portions of said sides, and supporting legs attached to the adjacent faces of said reinforced portions.

7. The combination with a beam having a top and depending downwardly divergent sides, of a pair of spaced braces each comprising an end portion and two angular downwardly divergent side portions integral therewith, said side portions being fastened to said sides whereby said braces connect and reinforce certain portion of said sides, and supporting legs attached to the adjacent faces of said reinforced portions, and supporting said beam directly on their upper ends.

8. In a device of the character described, a support on which articles may be supported, said support having flanges depending therefrom, supporting legs, and means connecting said legs and flanges whereby said legs may be moved from supporting position downwardly away from said support and then folded inwardly alongside said flanges, said legs when in supporting position receiving the weight of said support directly on their upper ends.

9. The combination with a beam having a top and depending sides, of a pair of spaced braces each comprising an end portion and two angular side portions integral therewith, said side portions being fastened to said sides whereby said braces connect and reinforce certain portions of said sides, and supporting legs attached to said reinforced portions, said legs having a limited sliding movement vertically relative to said beam, and adapted in their uppermost position to receive the weight of said beam directly on their upper ends.

10. The combination with a beam having a top and depending sides, of a pair of spaced braces each comprising an end portion and two angular side portions integral therewith, said side portions being fastened to said sides whereby said braces connect and reinforce certain portions of said sides, and supporting legs attached to said reinforced portions, the side portions of said braces having projecting portions at the top thereof bent to extend downwardly between said side portions and provide recesses receiving the upper ends of said legs.

11. The combination with a beam having a top and depending downwardly divergent sides, of a pair of spaced braces each comprising an end portion and two angular downwardly divergent side portions integral therewith, said side portions being fastened to said sides whereby said braces connect and reinforce certain portions of said sides, and supporting legs attached to the adjacent faces of said reinforced portions, said braces having means at the top thereof forming recesses receiving the upper ends of said legs whereby the weight of the device is supported on the upper ends of said legs.

12. The combination with a beam having a top and depending sides, of a pair of spaced braces each comprising an end portion and two angular side portions integral therewith, said side portions being fastened to said sides whereby said braces connect and reinforce certain portions of said sides, and supporting legs attached to said reinforced portions, the end portions of said braces having downturned projections at the top thereof providing recesses into which portions of said legs extend.

13. The combination with a beam having a top and depending sides, of a pair of spaced braces each comprising an end portion and two angular side portions integral therewith, said side portions being fastened to said sides whereby said braces connect and reinforce certain portions of said sides, and supporting legs attached to said reinforced portions, the end portions of said braces having downturned projections at the top thereof providing recesses into which portions of said legs extend and cooperating means on said downturned portions and said leg portions, yieldably holding said legs against downward movement relative to said beam.

14. The combination with a beam having a top and depending sides, of a pair of spaced braces each comprising an end portion and two angular side portions integral therewith, said side portions being fastened to said sides whereby said braces connect and reinforce certain portions of said sides, and supporting legs attached to said reinforced portions, said legs having a limited sliding movement vertically relative to said beam, the end portions of said braces having downturned projections at the top thereof providing recesses into which portions of said legs extend.

15. The combination with a beam having a top and depending sides, of a pair of spaced braces each comprising an end portion and two angular side portions integral therewith, said side portions being fastened to said sides whereby said braces connect and reinforce certain portions of said sides, and supporting legs attached to said reinforced portions, said legs having a limited sliding movement vertically relative to said beam, the end portions of said braces having downturned projections at the top thereof providing recesses into which portions of said legs extend and co-operating means on said downturned portions and said leg portions, yieldably holding said legs against downward movement relative to said beam.

In witness whereof, I hereunto subscribe my name this 20th day of January, A. D. 1928.

MARION W. PITNER.